Jan. 25, 1949. H. HEBO 2,460,084
FILTER
Filed Sept. 13, 1944
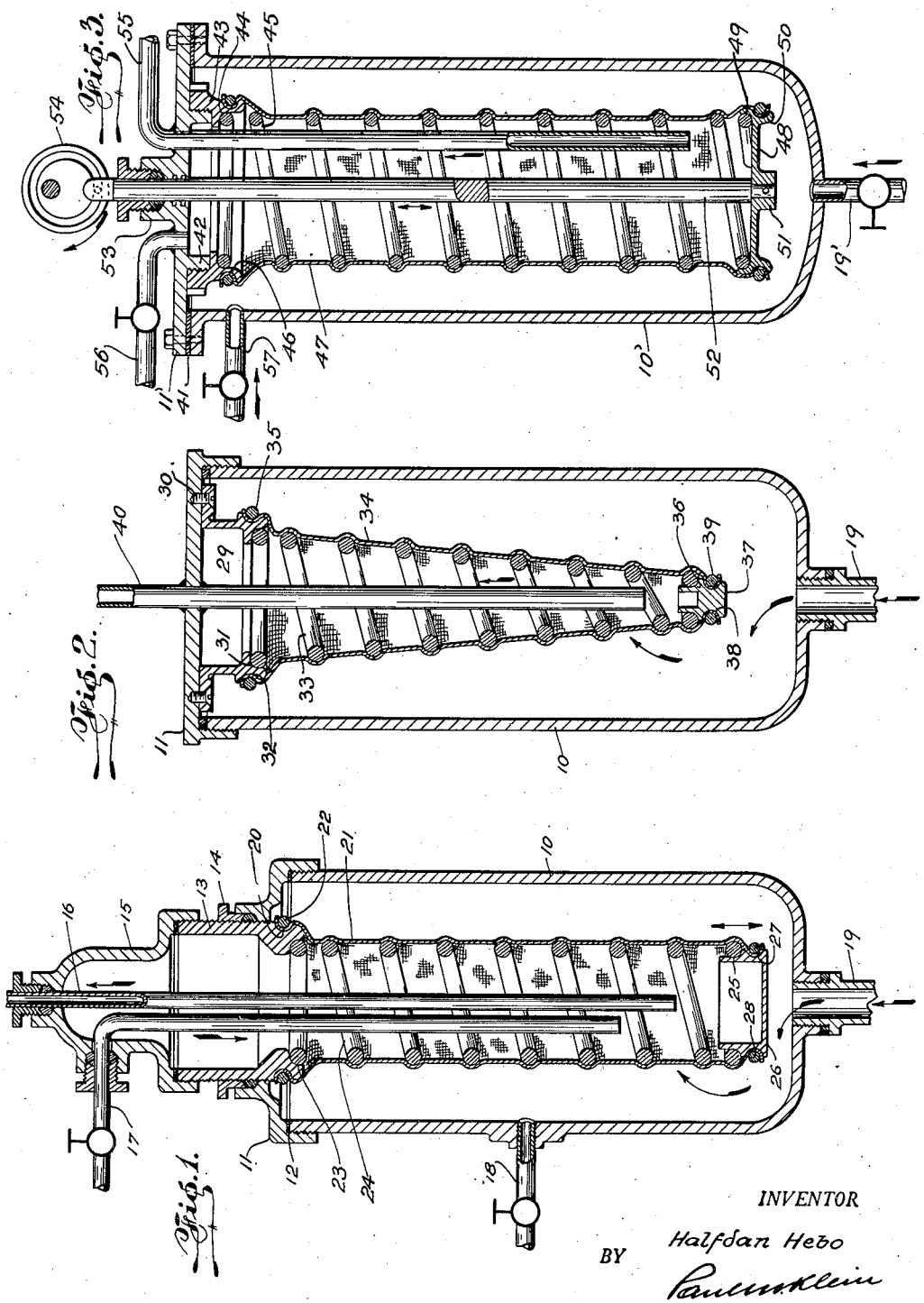
INVENTOR
Halfdan Hebo
BY
ATTORNEY.

Patented Jan. 25, 1949

2,460,084

UNITED STATES PATENT OFFICE 2,460,084

FILTER

Halfdan Hebo, New York, N. Y.

Application September 13, 1944, Serial No. 553,911

4 Claims. (Cl. 210—167)

This invention relates to filters in general, and particularly to self-cleaning filters, and to the method whereby filters may be rendered continuously self-cleaning. My invention particularly concerns improvements in filters adapted to filter or strain rapidly and continuously large quantities of filterable matter containing solids, which latter are intended to be continuously excluded from the filterable matter as it flows through the device, without the requirement of frequently stopping the operation for the purpose of demounting and cleansing the filter unit employed therein.

Broadly speaking the principle of my invention comprises a substantially closed vessel equipped with inlets and outlets and in which vessel is removably secured a filter unit. The latter comprises a relatively flexible filter member which is normally held in substantially stretched position or under tension by an operative support in the form of a helical spring, which latter is brought under slight compression by the filter member itself. The spring support for the filter member is forcibly held at one end within the vessel, while its other end and the major part of its body is rendered operative, that is compressible and expansible within certain limits, so that when a filterable matter enters the vessel and passes through the filter member, the support will be caused to be alternately compressed and released, thereby alternately relaxing and stretching, respectively, the filter member supported by it.

The operation of the support may either depend solely upon the movement imparted to the filter unit by the passing-through of the filterable matter under pressure, or by auxiliary mechanical means. However, in either event the operativeness of the filter member support is depended upon to alternately relax and stretch the filter member in rapid succession, whereby the solids accumulating at one face of the filter member are rapidly shaken off and out of the way of the in-flowing new filterable matter.

The method of imparting a combined vibratory, relaxing and stretching movement to the filter member at every point of its exposed area, while filtrate is passing therethrough, facilitates a continuous use of the filter mechanism for extended operating periods.

The prime objects of the present invention therefore are the provision of a filtering or straining device wherein the filtering unit is subjected to a continuous alternating reciprocal movement, and the method whereby, through such movement of the filtering unit, the solids of the filterable matter will be continuously removed from the filtering material as new filterable matter is forced therethrough.

Another object of the present invention is to provide a mechanism consisting of a substantially closed vessel, and wherein is operatively suspended a filter unit forming a mobile chamber composed of a resilient support and a pliable filter member exteriorly covering it, and constituting the wall of the chamber, said filter member being so mounted over the support that it somewhat compresses the latter and brings it under slight tension, while the filter member in turn is normally held in a stretched position by the compressed support. The body of the filter member may relax only then when the support is compressed in excess to its compression normally induced by the mounting of the filter member.

Another object of my invention is the method of automatically and continuously cleansing a filter while in operation, that is while filterable matter flows through the filter, which method comprises activating of the filter so that the solids of the filterable matter to be treated are continuously removed from the surface of the filter through which the filterable matter is to pass.

A further object of this invention is the method of cleansing a filter while filterable matter is passed therethrough, which consists of subjecting the filter material to a combined vibratory, stretching and relaxing movement, whereby all points of its effective area rapidly change their bodily positions, thereby preventing deposits of solid matter.

The foregoing major objects of my invention and numerous other important objects and advantages thereof will become better understood from the ensuing description of the accompanying drawings, which, while forming part of my disclosure, are held more or less in a diagrammatical form for explanatory purposes only, and which drawings are subject to changes and modifications to conform with the best mechanical practice in the manufacture of an efficient filtering device.

Before describing the detail constructions of the presently preferred forms of my invention, as shown in the drawings, may I state that I am well familiar with filter and strainer constructions employing filters in bag form and otherwise, supported by helical springs or frames of various designs, all of which are intended to keep the filter material stretched to enhance its filtering capacity, but that I have adapted an entirely different principle of employing an ever-mobile filtering unit within a closed vessel for purposes entirely foreign to the type of devices mentioned.

Referring now to the drawings:

Fig. 1 illustrates a vertical cross section through one form of my device;

Fig. 2 is a vertical cross section through a modified form of my device, employing a conically shaped helical spring support; and Fig. 3 is a cross section through a third modification of my device, wherein the vibratory movement imparted to the filter unit is caused by a suitable mechanism.

In each of the three modifications illustrated there is employed a substantially closed vessel within which operates a filter unit. Referring now specifically to Fig. 1, numeral 10 denotes a casing provided with a removable cover 11 which is internally threaded to engage an external thread at the upper end of casing 10, and which cover is rendered airtight by means of a suitable gasket 12. Within cover 11 there is removably secured a bushing 13 provided with a stuffing box 14 rendering the connection between cover 11 and bushing 13 airtight. Connected with bushing 13 is a dome 15 serving as connecting piece for outlet pipe 16 and valve-controlled rinser pipe 17. At the side of casing 10 there is provided a pipe connection 18 also controlled by a valve, while at the bottom of the casing there is removably secured an inlet pipe 19, which latter may also be controlled by a valve, not shown, such as illustrated in Fig. 3. All parts connected with cover 11 are intended to be removable. At the interior end of bushing 13 is preferably provided an annular groove 20 for the reception of the upper end of a filter member 21, which is forcibly held in the groove by a spring wire 22 or any other suitable means.

Diagonally opposite to groove 20 a seat 23 is provided in bushing 13 for accommodating a filter member support 24 in the form of a cylindrically shaped helical spring. The upper seated end of spring 24 is relatively immovable, while the rest of the spring body, including its essentially free end, is rendered operative in a manner which will be presently explained. The lower end of spring 24 rests in a groove 25 provided in end cup 26 which has a smaller exterior groove 27 for the reception of the free end of filter member 21, which is held in the groove by a spring ring 28 or similar means. The material of filter member 21 is so secured at its fixed and free ends to bushing 13 and cup 26, respectively, that helical spring support 24 is brought under slight tension, which tension however is intended to be sufficient for normally keeping the material of filter member 21 in stretched condition. The shape of the filter member is tubular and forms a closed bag open at its fixed end.

*Operation*

When filterable matter under pressure enters casing 10 by way of the inlet 19, it exerts pressure upon filter member 21 and momentarily compresses spring support 24. When the support is thus compressed the tension exerted by it upon filter member 21 is released and the material of the filter member is caused to relax.

Since the pressure to which the spring is subjected will vary slightly due to pulsations normally present in pumping devices carrying the filterable matter, the spring will automatically revert to its original expanded position during each alternately occurring low pressure period and thereby forcibly stretch filter member 21 to its normal position. At that moment any deposit on the filter member will be forcibly shaken off. The alternate compression and expansion of helical spring support 24 in axial direction obviously is very rapid so that filter member 21 is subjected to a vigorous and continuous movement at every point of its area. That movement consists of a rapidly alternating succession of stretching and relaxing of the filter material, whereby the latter is caused to forcefully and continuously vibrate and thus prevents the accumulation of solid deposits. When after a protracted operating period of the device the solid matter of the filterable matter is to be removed from casing 10, the normal inlet 19 is employed temporarily as an outlet, while outlet 16 is temporarily closed by a suitable valve, not shown. The valve of conduit 17 is now opened and liquid under pressure is passed into the hollow interior of the filter member. The pressure is sufficient to remove any solids which may adhere to the exterior of the filter member and will deposit them at the bottom of casing 10. From there the solids are flushed through pipe 19 to without. An additional cleansing of the filter member may be obtained by opening the valve of conduit 18, permitting liquid to pass into the casing interior from another direction to wash the filter material and to remove the solids from casing 10.

I have found that certain filterable matter containing viscous solids, such as resins, pentose, etc., which have the tendency of more tenaciously adhering to the filter material will, in my filter, progress towards the free end of the filter structure. In other words the solids will gradually move along the filter material towards the bottom of casing 10, which movement is due to the operation of the filter unit in the above outlined manner.

An important factor not shown in the drawings is to be considered. Depending upon the shape of the end cup 26 or the end cup of any of the modified forms of my device, different types of vibrations of the filter unit may be caused. Thus if, for instance, end cup 26 is convex, that is when it is bulging towards inlet 19, the filter unit will not only move in longitudinal directions, but will be subjected to a pendulum movement.

If on the other hand the shape of the cup is concave, a fairly uniform reciprocating action of the spring will ensue. In other words the compression and expansion of the spring in longitudinal direction will become more defined.

It is also possible to impart to the filter unit a slight rotary motion by providing at the exterior of the cup a blade, similar to a propeller blade, in which case the spring will be subjected to torsion, which will alternately twist the filter material in clockwise and anti-clockwise directions.

The above proposed changes in the shape or construction of the end cup of the filter unit are deemed to be so obvious in any of the three modifications of my device shown, and especially in the structures disclosed in Figs. 1 and 2, that it becomes unnecessary to incorporate such specific structures of the end cups in the drawings.

Attention is directed to the apparent disproportions evident in the illustrations, such as the size of the springs, the diameters of the different tubes, the thickness of the filtering material, etc. As has been stated previously the drawings are intended for explanatory purposes only, wherefore any exaggeration or diminution in the dimensions of the several parts should be disregarded and should be considered only as means to facilitate the explanation of the principle of the device.

Referring now to the modified form shown in Fig. 2, there will be again observed a casing 10 provided with a removable, tightly closing cover 11, at the interior surface of which there is provided an annular mounting 29 which is fastened by means of screws 30 or in any other suitable manner to the cover. Mounting 29 is provided with an interior seat 31 and an exterior seat 32, the former serving for accommodating the fixed end of a conically shaped, helical filter supporting member 33. Outer seat 32 serves for attaching the upper or fixed end of filter member 34, which fixed end is held in the groove or seat by an annulus 35. The free or bottom end of support 33 is lodged in an annular seat 36 of an end cap 37, which latter is provided with an external groove 38 for accommodating the smaller or free end of the conically shaped filter member. The latter is secured in the groove by means of an annulus 39.

Extending into the hollow interior of the combined filter unit, consisting of filter member 34 and filter member support 33, is an outlet pipe 40 which is preferably welded into cover 11. At the bottom of casing 10 a removable inlet 19 is provided, which may be equipped with a valve. The filter mounting 29 for the filter unit is intended to be removable from the cover so that it may be readily exchanged if it is so desired. While in this modification no additional inlet or outlet means are provided, such as inlet pipes 17 and 18 of Fig. 1, the same may be added if found advantageous.

The difference between the filter unit construction shown in Fig. 1 and that illustrated in Fig. 2 resides in their shapes and their operation. With a cylindrically shaped unit there will be only a slight tendency for its spring body to swing sidewise, while that tendency is clearly present in a conically shaped filter support. Thus in the modified form shown in Fig. 2 the vibrations imparted to the filter member, as explained in the construction shown in Fig. 1, are augmented by a swinging movement of the entire filter unit when filterable matter under pressure enters casing 10 and is propagated through the filter and to without the filter body through outlet 40. As in the construction of the embodiment shown in Fig. 1, the filter member in Fig. 2 is clamped in position in such a way that spring support 33 is brought under slight tension, which in turn normally causes stretching of the filter member. When filterable matter under pressure is introduced, spring support 33 becomes compressed and thus momentarily relaxes the filter member until the spring again expands to stretch it to its normal shape.

The third modification of my invention is illustrated in Fig. 3. In this form again a closed vessel 10' is indicated, which is provided with a removable cover 11', the latter being rendered airtight by means of a gasket 41. At the interior of the cover there is provided a threaded extension 42, to which is removably secured a mounting 43 for the filter unit. Also in this construction is provided an interior seat 44 for the filter member support 45, which in this case again is in the form of a cylinder. There is also an exterior seat 46 to which is secured the fixed end of filter member 47 in the manner explained in connection with the two previously described embodiments of my invention.

The free end of the filter unit terminates in a plate 48 provided with an internal seat 49 for the free end of filter member support 45, while an outer groove 50 accommodates the free end of filter member 47. At the center of plate 48 there is shown a hub 51 to which is attached the reduced end of operating rod 52 which extends through a stuffing box 53 provided in cover 11' and is engaged by an eccentric 54, or any other suitable means for actuating rod 52. Passing into the interior of the filter unit is an outlet pipe 55, which is secured to the cover, as is a valve-controlled flushing inlet 56. At the side of vessel 10' there will be seen a valve-controlled inlet 57, while at the bottom another valve-controlled inlet 19' is illustrated. Operating rod 52 in engagement with plate 48 or filter unit closing element 48 is adapted to cause the latter to reciprocate when eccentric 54 is turned, whereby filter support 45 becomes positively compressed and released in rapid succession, thus causing filter member 47 to alternately relax and stretch. This positive mechanical movement imparted to the filter unit is very similar to or identical with the movement of the units shown in Figs. 1 and 2, except that in these two first embodiments I depend solely upon the force of the filterable matter to induce the desired movement, whereas in the third modification the vibratory operation of the unit is controllable and may be adjusted to either increase or decrease the movement by varying the stroke of rod 52.

A positive mechanically induced operation of the filter unit is advantageous for filtering devices of relatively large dimensions intended for large filtering capacities. However the operating principle of the filtering unit in every one of the forms shown remains substantially unchanged, and it is my intention therefore to employ any one of the devices for treatment of filterable matter for which they are best suited, depending upon the characteristics and the quantity of filterable matter to be processed.

It will be noted that the outlet pipes in all three embodiments illustrated in the drawings extend substantially throughout the entire length of the filtering units and terminate in relatively close proximity to the movable ends of the units.

While only three embodiments of my device are shown and described, be it understood that changes and improvements may be required to meet specific conditions without departing from the broad scope of my invention based on the principle of a combined vibratory and alternating stretching and relaxing movement is imparted to the filter member while filterable matter passes therethrough, whereby sediments and solids are automatically removed from the filter material. Having thus described my invention, I claim:

I claim:

1. In a self-cleaning filter construction, an elongated vessel adapted for use in vertical position and having a central opening at its bottom, a removable, airtight closure for the top of the vessel, a mounting for a filter unit extending concentrically from the closure into the vessel and having interior and exterior groove-like seating means, a filter unit depending from said mounting into the vessel and comprising a helical spring element resting with its upper, relatively fixed end against said interior seating means, a pliable, substantially tubular filter member supported by and exteriorly covering said spring element, the upper, relatively fixed end of the filter member being secured in said exterior seating means of said closure mounting, a closing member at the lower end of the spring element and having upper and lower seating means, the lower, relatively movable end of said spring element engaging the upper seating means, the relatively movable lower end of the filter member being fixedly secured in said lower seating means of the closing member, an outlet conduit extending through the vessel closure into the filter unit and terminating in near proximity to said closing member, said filter member slightly compressing said spring element.

2. In a self-cleaning filter, as set forth in claim 1, said filter member and its supporting spring member being of a substantially cylindrical formation.

3. In a self-cleaning filter, as set forth in claim 1, said filter member and its supporting spring member being of a substantially conical formation.

4. In a self-cleaning filter, as per claim 1, and reciprocating means extending through the vessel closure and being attached to said closing member for imparting motion to the filter unit.

HALFDAN HEBO.

REFERENCES CITED

The following references are of record in the file of this patent:

UNITED STATES PATENTS

| Number | Name | Date |
|---|---|---|
| 1,094,321 | Finch, Jr. | Apr. 21, 1914 |
| 1,324,635 | Ascoli | Dec. 9, 1919 |
| 1,607,027 | Wall | Nov. 16, 1926 |
| 1,696,313 | Liddell | Dec. 25, 1928 |
| 1,757,834 | Haegler | May 6, 1930 |
| 1,760,764 | Merrell et al. | May 27, 1930 |
| 1,806,513 | Straus-Scharina | May 19, 1931 |
| 2,031,589 | Burckhalter et al. | Feb. 25, 1936 |
| 2,162,043 | Westlund et al. | June 13, 1939 |
| 2,167,236 | Gieseler | July 25, 1939 |

FOREIGN PATENTS

| Number | Country | Date |
|---|---|---|
| 467,511 | Germany | Oct. 25, 1928 |